US007280248B2

(12) United States Patent
Akiyama

(10) Patent No.: US 7,280,248 B2
(45) Date of Patent: Oct. 9, 2007

(54) PRINTER DRIVER FOR SETTING STENCIL PRINTING MACHINE PRINTING CONDITION ITEMS AND THE LIKE

(75) Inventor: Hideki Akiyama, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 792 days.

(21) Appl. No.: 09/782,220

(22) Filed: Feb. 14, 2001

(65) Prior Publication Data

US 2001/0017704 A1 Aug. 30, 2001

(30) Foreign Application Priority Data

Feb. 24, 2000 (JP) .......................... P2000-047836

(51) Int. Cl.
*G06F 15/00* (2006.01)
*G06K 1/00* (2006.01)

(52) U.S. Cl. .................... 358/1.9; 358/1.14; 358/3.29; 101/48

(58) Field of Classification Search ................. 358/1.9, 358/1.15, 1.1, 1.11-1.18, 3.28-3.29; 101/48-51, 101/114-129
See application file for complete search history.

(56) References Cited

U.S. PATENT DOCUMENTS 5,133,919 A 7/1992 Hasegawa et al.
5,671,669 A * 9/1997 Okuda et al. ............... 101/116
5,689,626 A 11/1997 Conley
5,704,021 A * 12/1997 Smith et al. ................. 358/1.9
6,181,436 B1 * 1/2001 Kurachi ..................... 358/1.15
6,301,013 B1 * 10/2001 Momose et al. ........... 358/1.15
6,362,892 B1 * 3/2002 Lee et al. .................. 358/1.13
6,396,594 B1 * 5/2002 French et al. ............. 358/1.18
6,426,798 B1 * 7/2002 Yeung ....................... 358/1.13
6,621,590 B1 * 9/2003 Livingston ................ 358/1.15
6,765,685 B1 * 7/2004 Yu ............................ 358/1.13
6,943,907 B1 * 9/2005 Kim .......................... 358/1.14
2005/0141008 A1 * 6/2005 Billow et al. ............. 358/1.13

FOREIGN PATENT DOCUMENTS

EP 0 942 355 9/1999
EP 942355 A2 * 9/1999
JP 59-198185 11/1984
JP 63-74679 4/1988

* cited by examiner

*Primary Examiner*—Gabriel I. Garcia
*Assistant Examiner*—Thierry L. Pham
(74) *Attorney, Agent, or Firm*—The Nath Law Group; Jerald L. Meyer; Matthew J. Moffa

(57) ABSTRACT

In the disclosed invention, when watermark print is set during printing, the printer driver makes a secret operation setting for holding the secret of print data accordingly, and transmits this print data to the stencil printing machine. Therefore, even if the printing of the stencil printing machine is remotely operated, it is possible to prevent an inadvertent failure to set a secret operation and to keep the secret of print data.

2 Claims, 7 Drawing Sheets

PRINTER DRIVER FOR SETTING STENCIL PRINTING MACHINE PRINTING CONDITION ITEMS AND THE LIKE

BACKGROUND OF THE INVENTION

1. Field of the Invention

The present invention relates to a printer driver for setting items such as printing conditions for a stencil printing machine connected to a host computer, and particularly relates to a printer driver capable of allowing a stencil printing machine to automatically carry out the secret operation of when selecting watermark print in item setting.

2. Description of the Related Art

Because of the structure of a stencil printing machine for printing using a stencil sheet, when the machine prints once, the stencil sheet on a print drum is left until the next printing starts.

As a device for preventing the leak of the secret of this used stencil sheet, there is proposed a device for disposing of a used stencil sheet if a user selects a predetermined button provided on a stencil printing machine, after printing is finished.

There is also proposed a device constituted such that if a user selects a predetermined button provided on a stencil printing machine after printing is finished, a printing operation is not carried out unless the next original is set.

Further, there is proposed a configuration in which the stencil printing machine is connected to a remote host computer through communications. In this case, the host computer sets secret operation items and executes printing so as to keep the secret of the stencil sheet. To be specific, the secret operation items are set on a printer driver provided in the host computer.

FIG. 1 shows a printer driver setting screen.

As shown in FIG. 1, some printer drivers are capable of selecting setting items for watermark print to print a secret document and the like.

With this structure, if a user operates and uses the stencil printing machine nearby, the user can select a secret button after printing is finished and promptly move to a secret operation.

However, if the remote host computer executes printing having secret and a secret operation setting is not made by the printer driver of the host computer, then a used stencil sheet is left attached to a print drum and the secret of the stencil sheet cannot disadvantageously kept. In such a case, a person who executes printing (or host computer user) has to go to the stencil printing machine and operate a secret button provided on the machine to execute the secret operation so as to keep the secret after printing.

During this, a time period in which the user who printed is absent occurs at a stencil printing machine side. Due to this, there is fear that a document or the like written (set up) on the stencil sheet used for printing cannot be kept secret to thereby disadvantageously cause damage.

SUMMARY OF THE INVENTION

It is an object of the present invention to provide a printer driver capable of preventing an inadvertent failure to set a secret operation when a remote host computer operates a stencil printing machine to print and capable of keeping the secret of a document.

To obtain the above object, the present invention provides a printer driver at a host computer while said host computer is connected to a stencil printing machine through communications, for setting items of various printing conditions for said stencil printing machine, wherein the various setting items for said printing conditions are displayed; if a watermark print item is selected on the setting items, a secret operation item for allowing said stencil printing machine to execute a secret keeping operation for print data is selected accordingly; and information on the items are transmitted, together with the print data, to the stencil printing machine.

Further, the present invention provides a printer driver at a host computer while said host computer is connected to a stencil printing machine through communications, for setting items of various printing conditions for said stencil printing machine, wherein the various setting items for said printing conditions are displayed; if a watermark print item is selected on the setting items, a selection screen of a secret operation item for allowing said stencil printing machine to execute a secret keeping operation for print data secret is displayed; the items are made selectable; and information on the selected items are transmitted, together with the print data, to the stencil printing machine.

With the above constitution, when watermark print is set during printing, the printer driver makes a secret operation setting for holding the secret of print data accordingly, and transmits this print data to the stencil printing machine. By doing so, even if the printing of the stencil printing machine is remotely operated, it is possible to prevent an inadvertent failure to set a secret operation and to keep the secret of print data.

Other and further objects and features of the present invention will become obvious upon understanding of the illustrative embodiments about to be described in connection with the accompanying drawings or will be indicated in the appended claims, and various advantages not referred to herein will occur to one skilled in the art upon employing of the invention in practice.

DETAILED DESCRIPTION OF THE PREFERRED EMBODIMENTS

Figure 1:
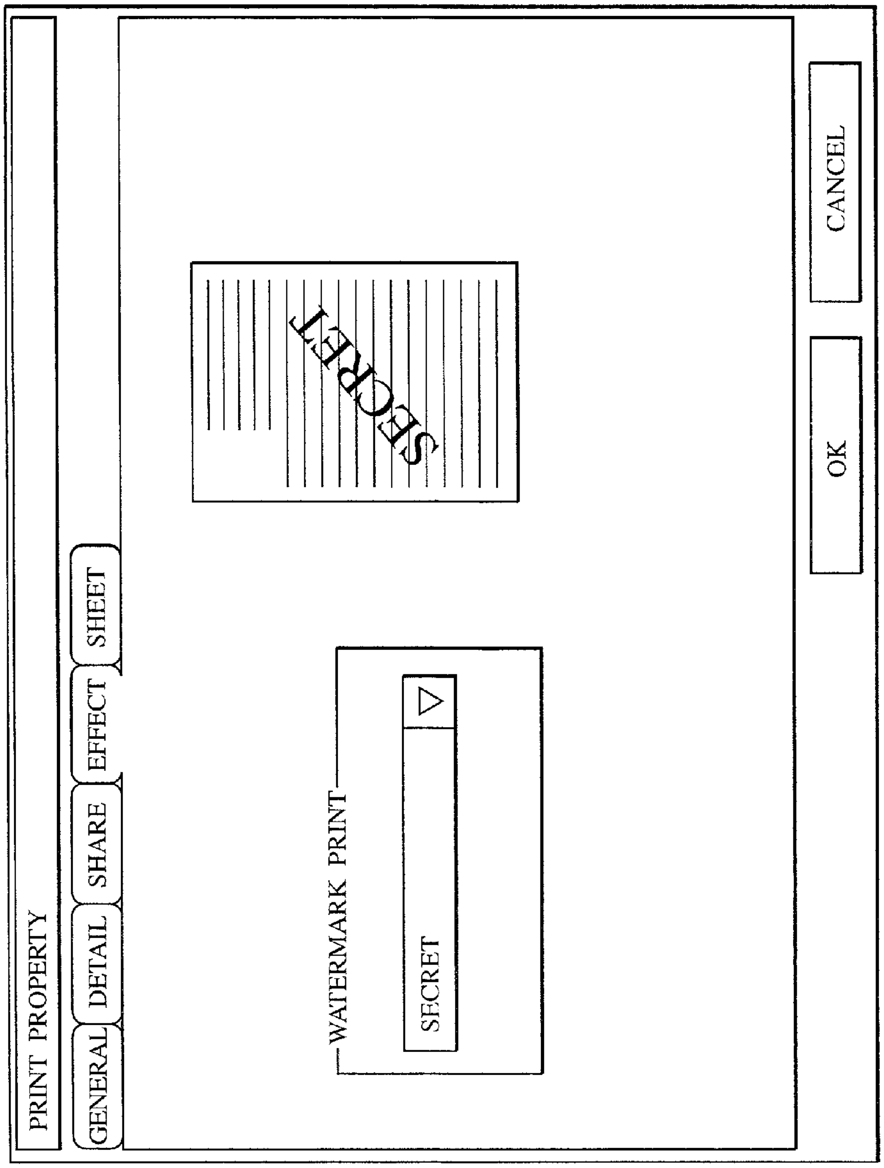
FIG. 1 PRIOR ART
FIG. 1 shows the setting screen of a conventional printer driver.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

The embodiments of a printer driver according to the present invention will be described hereinafter.

First Embodiment

First, description will be given to the constitution of a stencil printing system to which a printer driver according to the present invention is applied.

Figure 2:
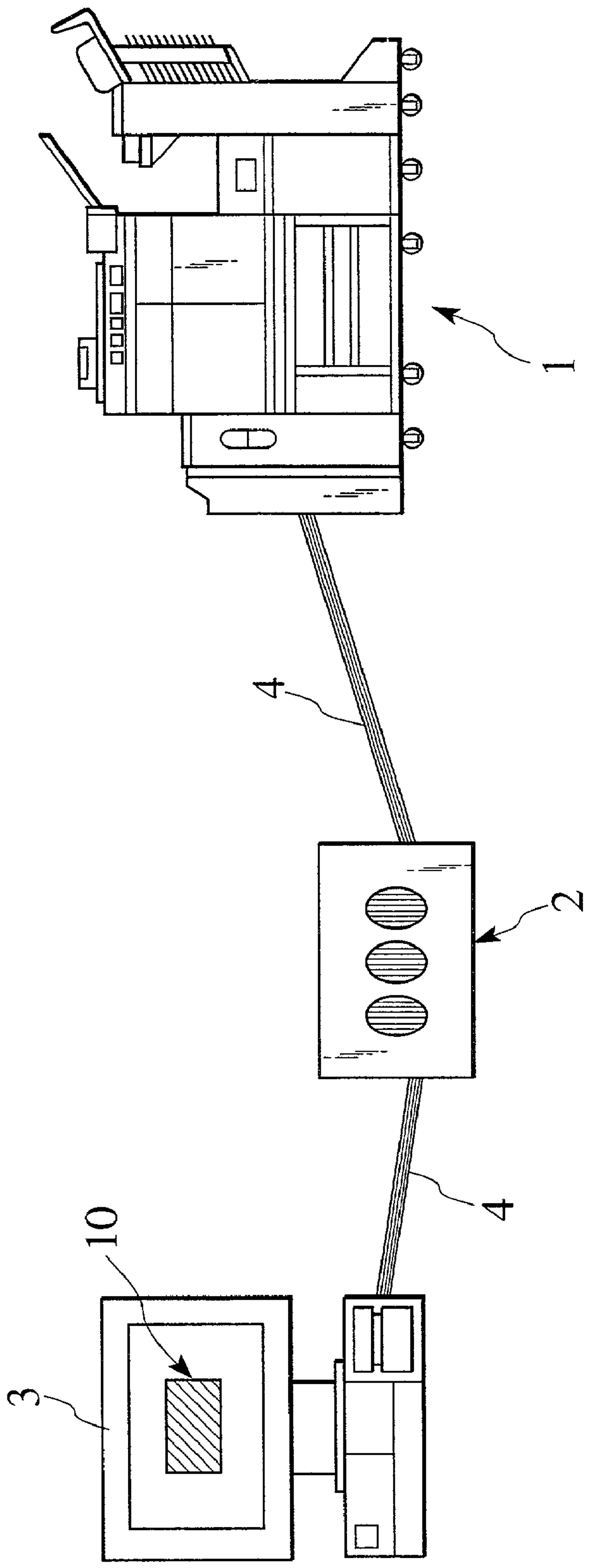
FIG. 2 shows the overall constitution of a stencil printing system to which a printer driver according to the present invention is applied.

FIG. 2 shows the overall constitution f the stencil printing system to which the printer driver according to the present invention is applied.

As shown in FIG. 2, the stencil printing system consists of a stencil printing machine 1, a controller 2 and a host computer 3. The stencil printing machine 1 and the host computer 3 are connected to each other by a communication line 4 through the controller 2. The controller 2 converts print data transmitted from the host computer 3 into data which can be printed by the stencil printing machine 1.

A printer driver 10 is installed into the host computer 3 and is a print control program executed on this host computer 3. This printer driver 10 is started and operated when the host computer 3 executes printing using the stencil printing machine 1.

This printer driver 10 sets various printing conditions including a printing speed, the number of copies to be printed, a print density, a secret operation and the like when a user uses the remote stencil print machine 1 from the host computer 3 side.

Next, a secret processing setting operation executed by the printer driver will be described.

Figure 3:
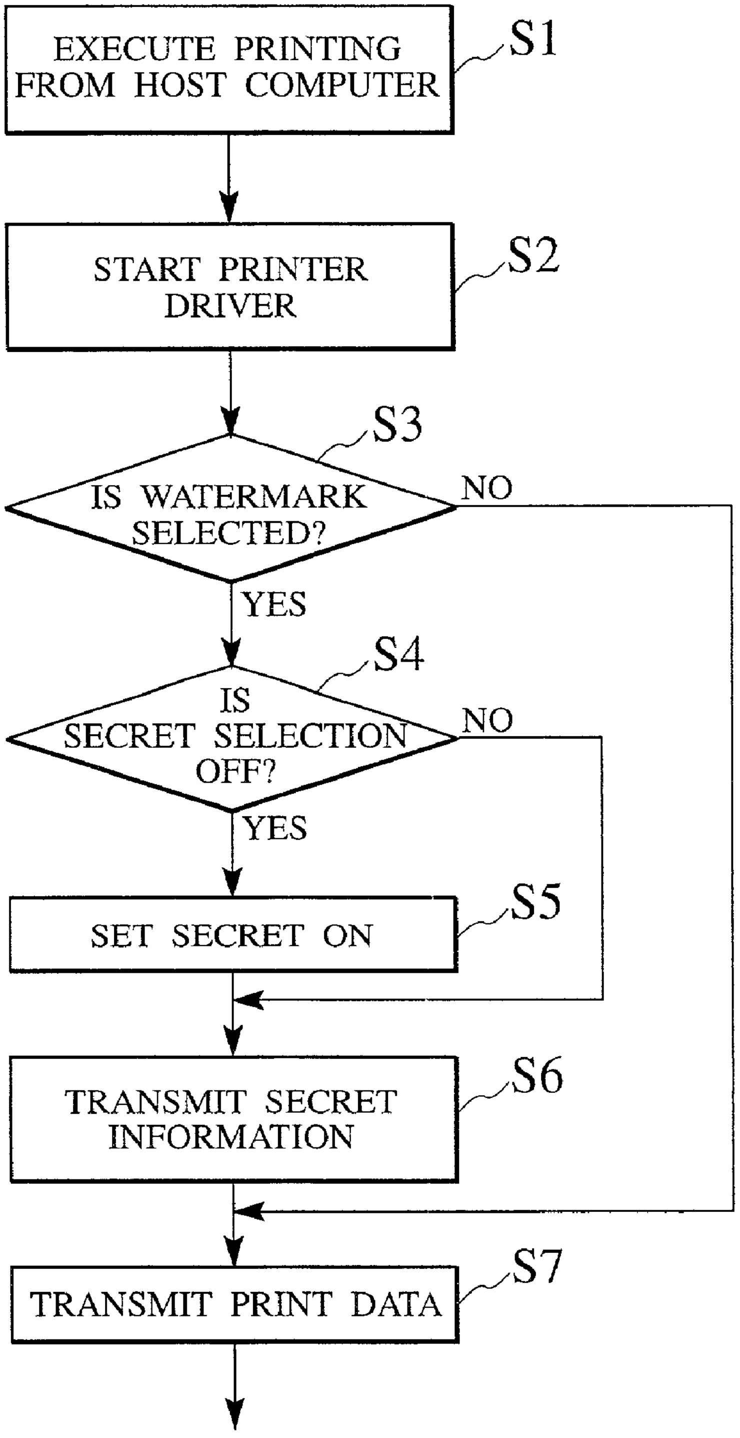
FIG. 3 shows the secret operation of the printer driver in the first embodiment according to the present invention.

FIG. 3 is a flow chart for describing the secret processing setting operation executed by the printer driver.

As shown in FIG. 3, in this embodiment, a user executes the printing of, for example, edited sentences having secret by an application running on the host computer 3 (in S1) using the stencil printing machine 1. In response to the print execution, the printer driver 10 is started (in S2). Thereafter, the printer driver 10 judges whether "watermark print" is included to print the sentences.

Figure 4:
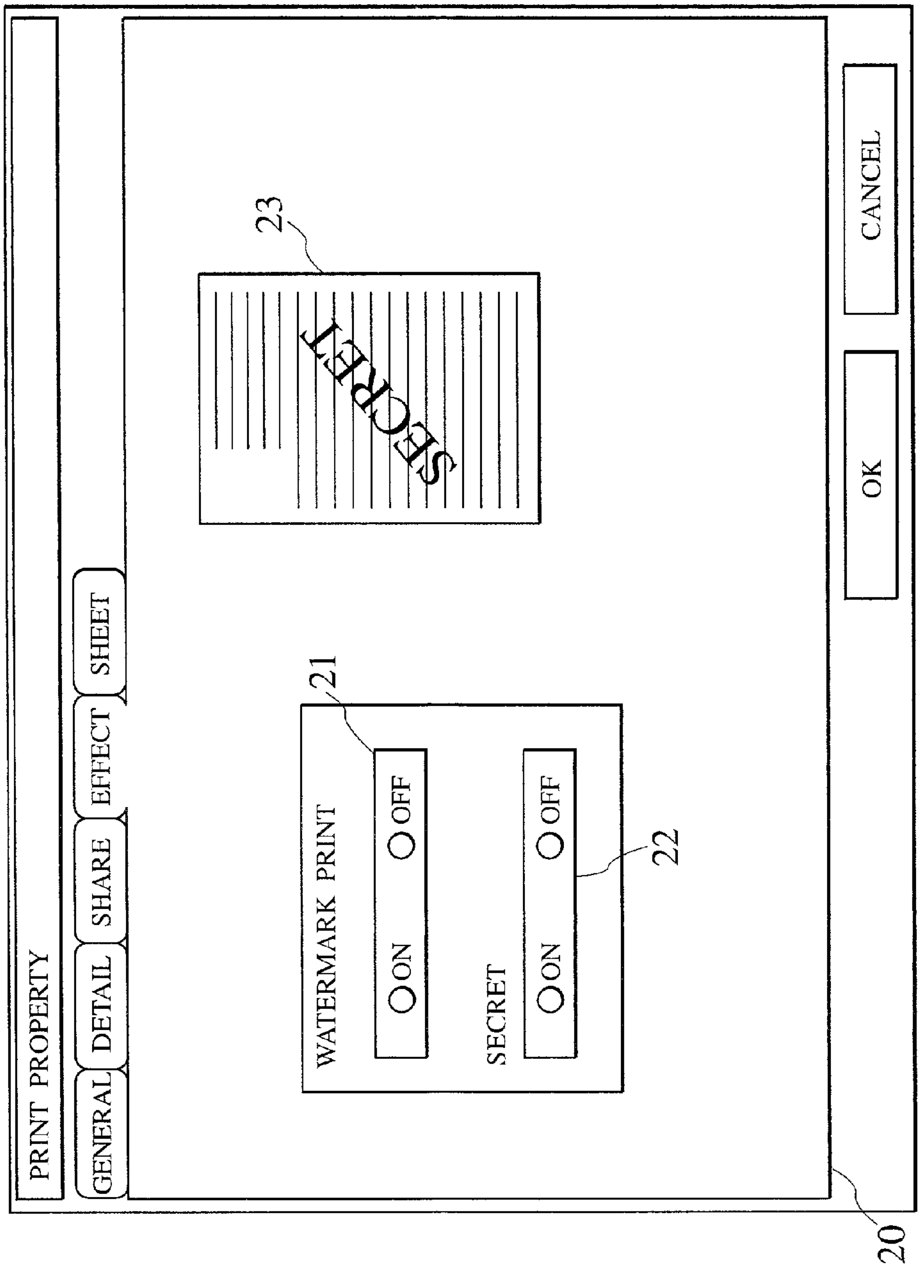
FIG. 4 shows a secret operation setting item screen.

FIG. 4 shows a part of the setting item screen of the printer driver 10.

As shown in FIG. 4, a "watermark print" setting screen 20 is prepared on the setting item screen. Then, "a watermark image" 23 is displayed on the screen. When the user selects "watermark print" setting item 21 from the "watermark print" setting screen 20 ("YES" in S3), the printer driver 10 automatically selects "secret operation" selection item 22 in cooperation with this selection of "watermark print" setting item ("YES" in S4). At this moment, if "secret operation" select item 22 is OFF ("NO" in S4), the printer driver 10 changes "secret operation" select item 22 to "ON" (in S5).

If the user executes printing after finishing "watermark print" setting, the printer driver 10 transmits information on the secret operation (in S6) and print data (in S7) to the controller 2. If "watermark print" is not selected ("NO" in S3), the printer driver 10 does not transmit the information on the secret operation but transmit only the print data.

The controller 2 receives the print data transmitted from the host computer 3 and acquires secret ON information. After converting the print data into data which can be printed by the stencil printing machine 1, the controller 2 transmits the converted data to the stencil printing machine 1 to allow the stencil printing machine 1 to make a stencil and print. The controller 2 controls the stencil printing machine 1 to execute a secret operation after the data is printed by the number of copies designated by the printer driver 10.

Figure 5:
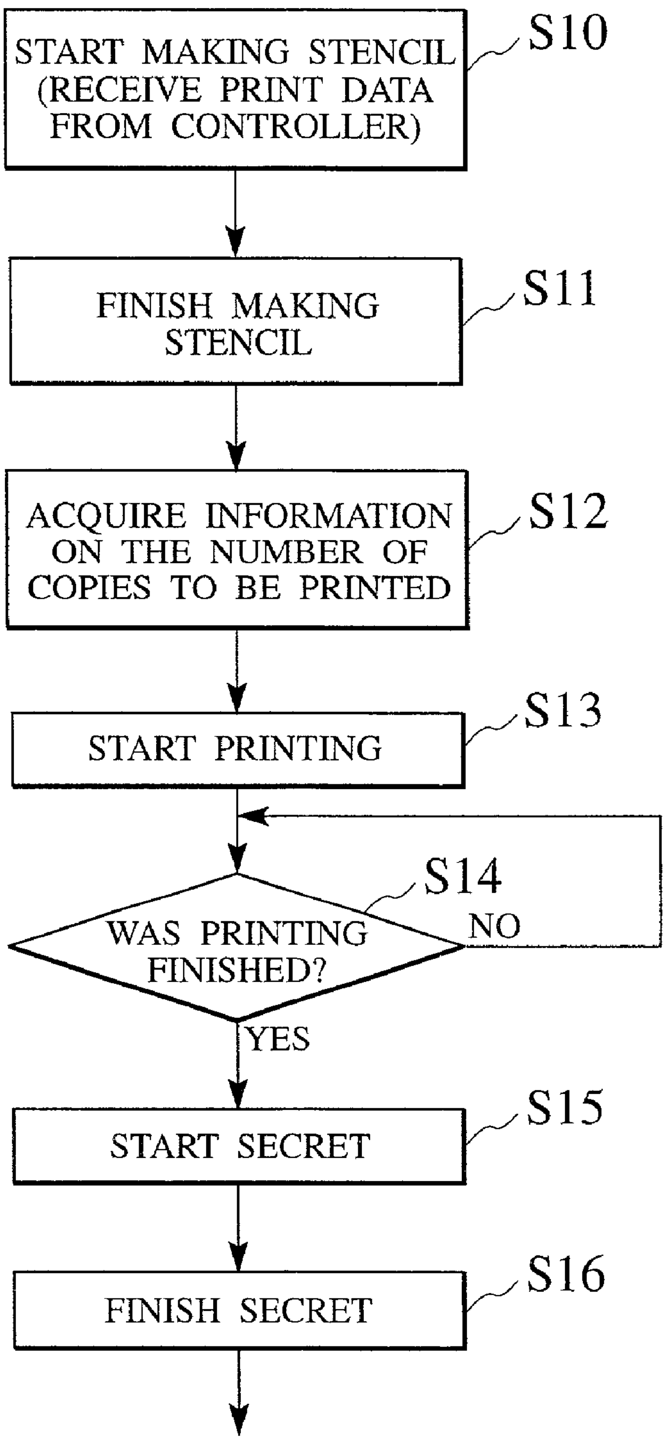
FIG. 5 shows the secret operation of the stencil printing machine.

FIG. 5 is a flow chart showing the printing operation of the stencil printing machine 1.

As shown in FIG. 5, when receiving the print data from the controller 2, the stencil printing machine 1 starts a stencil making operation (in S10). In the stencil making operation, a stencil sheet is thermally made by a thermal head or the like and a perforated image corresponding to the print data is thereby formed on the stencil sheet.

When the stencil making operation is finished (in S11), information on the number of printed copies is obtained from the print data (in S12) and then printing is started to print as many as sheets as the information (in S13). The stencil sheet made is attached to a print drum, print sheets are fed while rotating the print drum and a print data image is formed on the respective printing sheets. During the printing, the stencil printing machine 1 executes "watermark print" based on the print data.

When the printing of the number of copies to be printed is finished ("YES" in S14), the secret operation is started (in S15). Namely, soon after the completion of printing, the used stencil sheet is removed from the print drum to make printing impossible and the removed stencil sheet is disposed of in a stencil disposal box. When the secret operation is finished (in S16), a secret printing operation based on the print data is finished and printing operation returns to a normal printing state.

As can be seen from the above, according to the first embodiment, since "secret operation" is automatically set when selecting "watermark print", it is possible to prevent a user from forgetting making a secret setting.

Second Embodiment

Next, the printer driver in the second embodiment according to the present invention will be described.

The constitution of the system in the second embodiment is the same as that shown in FIG. 2. The constituent elements of the system will not be, therefore, given herein.

In the second embodiment, it is possible that a user selects the secret operation, arbitrarily.

Figure 6:
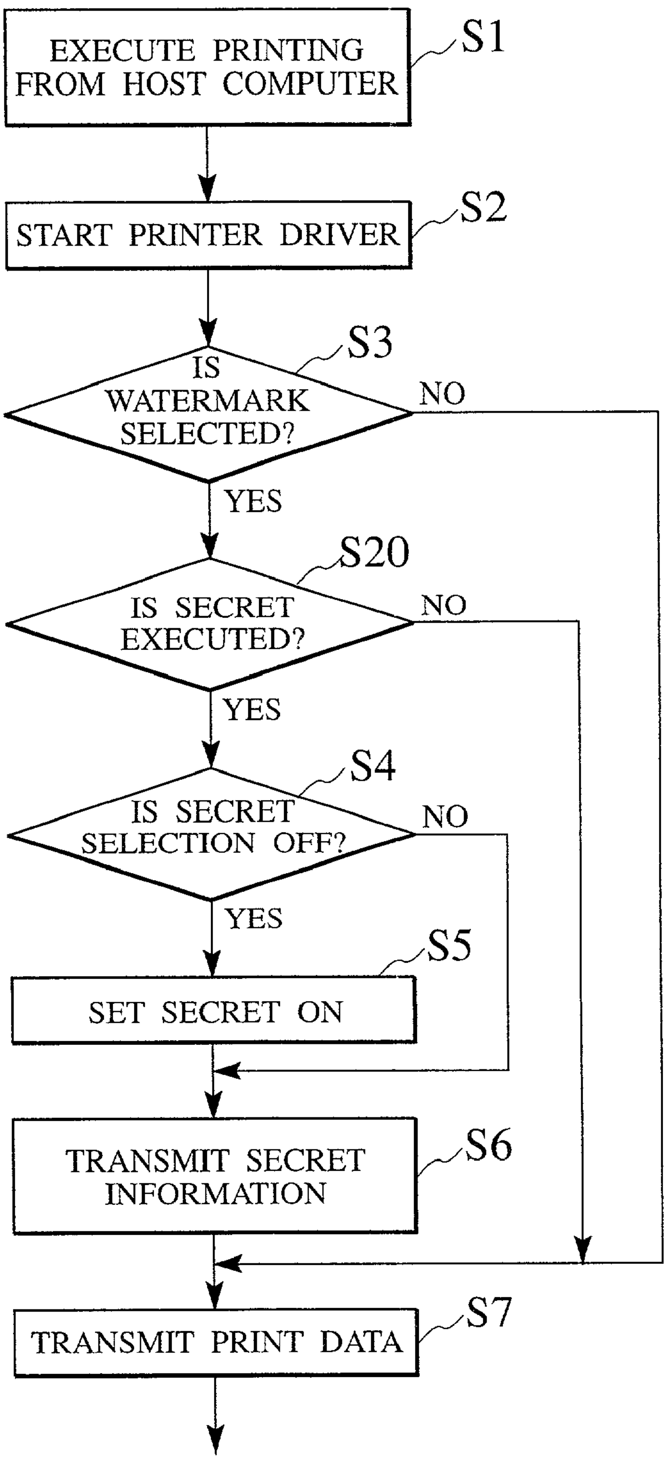
FIG. 6 shows the secret operation of the printer driver in the second embodiment according to the present invention.

FIG. 6 is a flow chart showing a secret processing setting operation executed by the printer driver in the second embodiment.

In the second embodiment, when a user prints edited sentences by an application on the host computer 3 using the stencil printing machine 1 (in S1), the setting screen 20 shown in FIG. 4 actuated by the printer driver 10 is displayed (in S2).

Figure 7:
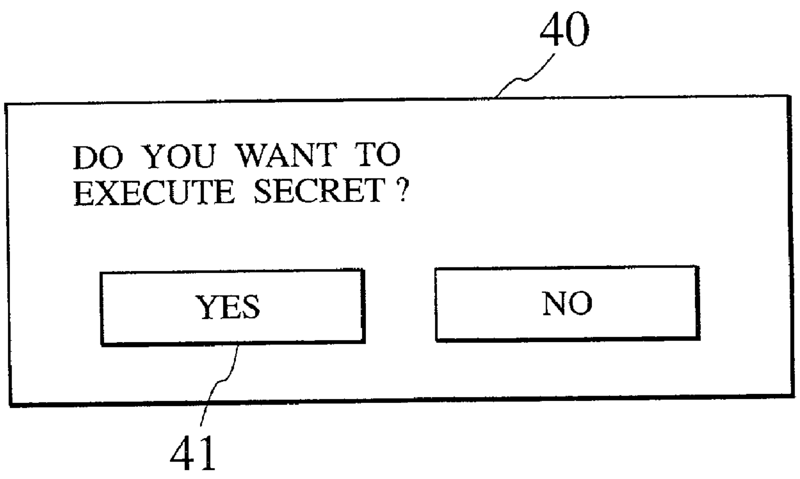
FIG. 7 shows a secret operation selection screen in the second embodiment.

The "watermark print" setting item 21 is displayed on the setting screen 20 and the watermark print is selected by the user (in S3). Here, if the user selects "watermark print" ("YES" in S3), the printer driver 10 displays a selection screen 40 (see FIG. 7) to select whether or not a secret operation is executed, to the user (in S20).

If the user selects a secret execution key 41 ("YES" in S20), the printer driver 10 selects the secret operation. At this moment, if the "secret operation" selection screen 22 is OFF ("NO" in S4), the printer driver 10 changes the "secret operation" selection item 22 to "ON" (in S5). If "secret operation" is not selected ("NO" in S20), the printer driver 10 leaves the "secret operation" selection item 22 "OFF".

When the user executes printing after the completion of the setting stated above, the printer driver 10 transmits information on the secret operation (in S6) and print data (in S7) to the controller 2. If "watermark print" is not selected ("NO" in S3) or "secret operation" is not selected ("NO" in S20), the printer driver 10 does not transmit the information on the secret operation but transmits only the print data.

The stencil printing machine 1 executes the same printing operation as shown in FIG. 4. If the "secret operation" selection item is ON, the stencil printing machine 1 executes the secret operation in S15. If the "secret operation" selection item is OFF, the stencil printing machine 1 finishes printing without executing the secret operation in S15.

As can be seen, according to the second embodiment, "watermark print" and "secret operation" can be independently set. In addition, since whether to set "secret operation" or not is displayed and selected in cooperation with the setting of "watermark print", it is possible to prevent a user from forgetting making a secret setting and to arbitrarily set the secret operation.

Other Embodiments

Various modifications will become possible for those skilled in the art after receiving the teachings of the present disclosure without departing from the scope thereof.

It goes without saying that the present invention includes various embodiments which are not disclosed herein. Accordingly, the technical scope of the invention should be defined only by the claims which follows and which are reasonable from the above description.

What is claimed is:

1. A computer readable medium storing a printer driver provided at a host computer while said host computer is connected to a stencil printing machine through communications, for setting items of various printing conditions for said stencil printing including a number of copies to be printed, wherein the various setting items for said printing conditions are displayed;

if the printer driver determines that a watermark print item is selected on the setting items, the printer driver automatically selects a secret operation item said secret operation item instructing said stencil printing machine to remove a used stencil sheet from a print drum and dispose of said used stencil sheet after said number of copies have been printed; and information on the items are transmitted, together with the print data, to the stencil printing machine.

2. A computer readable medium storing a printer driver, provided at a host computer while said host computer is connected to a stencil printing machine through communications, for setting items of various printing conditions for said stencil printing machine including a number of copies to be printed, wherein the various setting items for said printing conditions are displayed;

if a watermark print item is selected on the setting items, a selection screen of a secret operation item for allowing said stencil printing machine to execute a secret keeping operation for print data secret is displayed;

the items are made selectable;

if the printer driver determines that said secret operation item is selected, the printer driver automatically selects a secret keeping operation for print data, said secret keeping operation instructing said stencil printing machine to remove a used stencil sheet from a print drum and dispose of said stencil sheet after said number of copies have been printed; and information on the selected items are transmitted, together with print data, to the stencil printing machine.

* * * * *